Feb. 10, 1953     E. F. MARTINET     2,627,937
SUCTION CLEANER MOTOR FILTER CONSTRUCTION
Filed Aug. 24, 1950
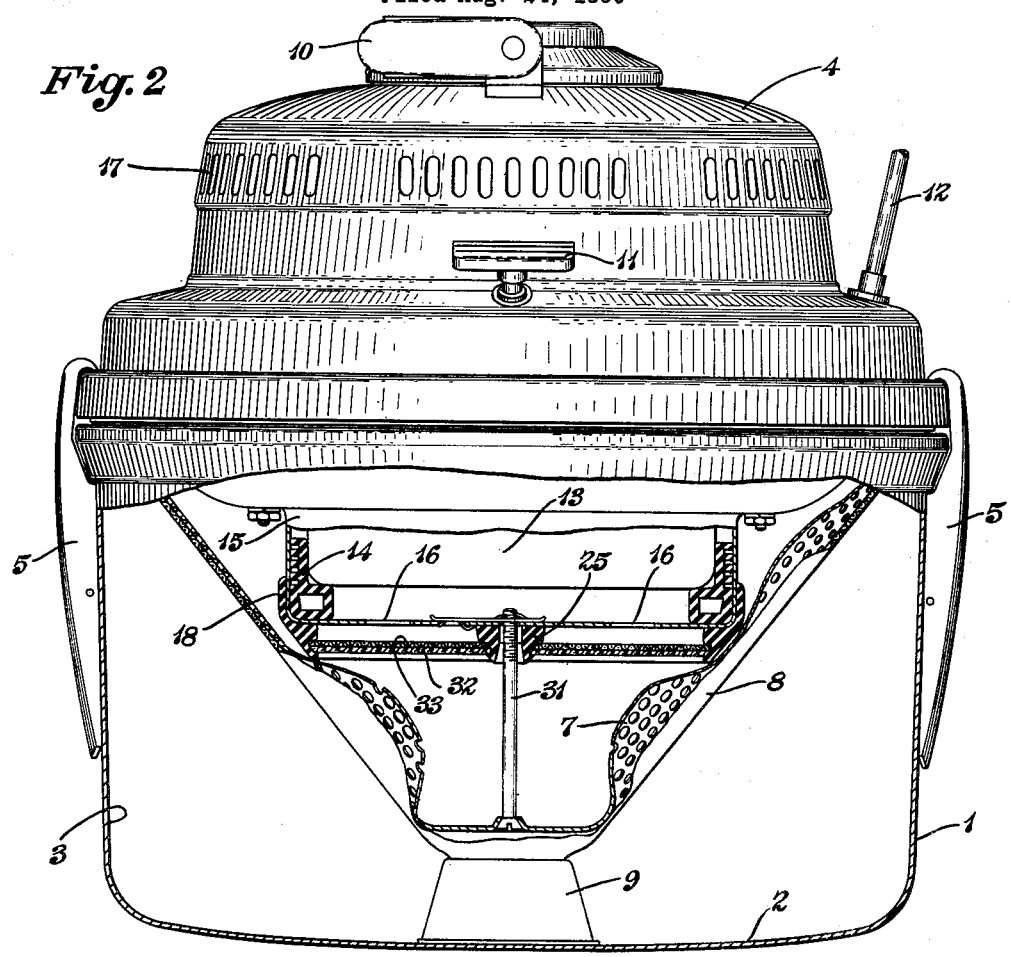
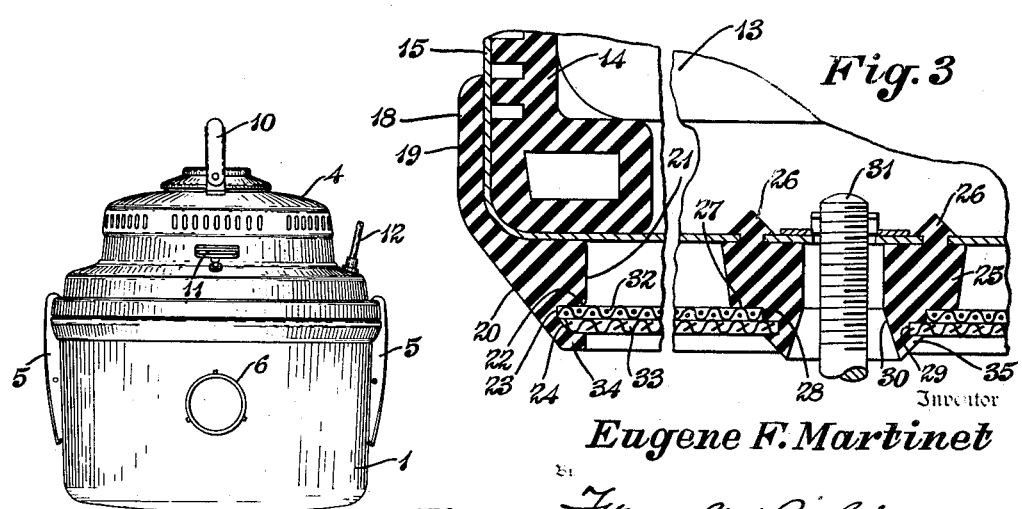
Inventor
Eugene F. Martinet
by Fraser and Bishop
Attorneys Patented Feb. 10, 1953

2,627,937

UNITED STATES PATENT OFFICE 2,627,937

SUCTION CLEANER MOTOR FILTER CONSTRUCTION

Eugene F. Martinet, Cleveland, Ohio, assignor to Royal Vacuum Cleaner Company, Cleveland, Ohio, a corporation of Ohio Application August 24, 1950, Serial No. 181,268

9 Claims. (Cl. 183—37)

The invention relates to suction cleaners, and more particularly to a secondary filter construction for protecting the motor of the motor-fan unit of a tank type suction cleaner.

In the prior construction of tank type suction cleaners a removable filter element made either of cloth or paper is used to filter and collect the dust, dirt and other foreign material picked up by the cleaner in use. These filters are removed or replaced in emptying the cleaner dust collector. Sometimes the operator forgets to replace the filter particularly when a disposable and replaceable paper filter is used. In such instance, if the cleaner is operated without replacing the usual or normal filter, dust, dirt and other foreign material picked up by the cleaner will pass entirely through the cleaner.

Usual tank type suction cleaners have the motor and fan built and installed as a unit in the assembly of the cleaner so that the air drawn in by and discharged by the fan passes through the motor. If such a cleaner is operated without a dust filter, the dust and dirt passing through the motor-fan unit will accumulate and collect in various parts of the motor, the motor bearings, etc., which may permanently damage the motor and require replacement thereof.

Even suction cleaners equipped with fabric or paper filters for collecting the dust and dirt picked up by the cleaner may not completely filter such dust and dirt, and a small portion of the dust may pass through the filter and collect in the motor.

Accordingly, it is an object of the present invention to provide a new secondary filter construction for a tank type suction cleaner which is semi-permanently installed therein so as to protect the cleaner motor from damage in the event that the cleaner is operated without the usual primary filter.

Furthermore, it is an object of the present invention to provide a new secondary filter construction for a tank type suction cleaner which protects the cleaner motor from damage from dust which may not be filtered or collected by the usual filter and dust collector of the suction cleaner.

Also, it is an object of the present invention to provide a new secondary filter construction for a tank type suction cleaner which can readily be placed and located in proper motor protective dust filtering position.

Although the secondary filter comprehended by the present invention need not be replaced frequently, yet it should be occasionally replaced and therefore the construction and mounting thereof should be of such character that the secondary filter is inexpensive and readily replaceable.

Accordingly, it is a further object of the present invention to provide a new secondary filter construction for a tank type suction cleaner which is inexpensive and readily replaceable.

Finally, it is an object of the present invention to satisfy the needs and solve existing problems in the construction of tank type suction cleaners, to eliminate prior art difficulties in this field, generally to improve and simplify tank type suction cleaner construction, and to obtain the foregoing advantages and desiderata in a simple, inexpensive and effective manner.

These and other objects and advantages apparent to those skilled in the art from the following description and claims may be obtained, the stated results achieved, and the described difficulties overcome by the improvements, elements, combinations, sub-combinations, arrangements, and constructions, which comprise the present invention, the nature of which is set forth in the following general statement, a preferred embodiment of which—illustrative of the best mode in which applicant has contemplated applying the principles—is set forth in the following description and shown in the drawing and which are particularly and distinctly pointed out and set forth in the appended claims forming part hereof.

The nature of the discoveries and improvements in motor-protective filter construction for tank type suction cleaners may be stated in general terms as preferably including in a tank type suction cleaner, a motor-fan unit having housing walls enclosing the motor and fan, there being suction openings in one of the housing walls, a filter mounting, preferably rubber, ring member carried by the housing surrounding said suction openings, a filter centering member carried by the housing preferably axially of said mounting ring, there being a shouldered annular groove in said ring member spaced from the housing wall having the suction openings therein and surrounding said centering member, there being an annular shouldered groove in said centering member opening circumferentially toward said first mentioned groove and spaced from said housing wall and openings, and relatively stiff disc-like filtering means inserted in and held by said grooves in spaced relation with said housing wall and openings.

By way of example, the improved secondary filter construction for tank type suction cleaners of the present invention is shown in the accompanying drawing forming part hereof, wherein:

Figure 1 is a side elevation of a suction cleaner equipped with the new secondary filter construction of the present invention;

Fig. 2 is an enlarged elevation with parts broken away and in section of the vertical tank type suction cleaner illustrated in Fig. 1; and Fig. 3 is an enlarged fragmentary sectional view of a portion of Fig. 2.

Similar numerals refer to similar parts throughout the various figures of the drawing.

The suction cleaner shown in the drawing is a vertical tank type suction cleaner and as illustrated includes a pan-like dust collector or tank member generally indicated at 1 formed by a bottom wall 2 and an annular side wall 3 on which a dome unit 4 is removably mounted and held assembled thereto by releasable clamps 5. The tank member 1 is preferably provided with an inlet opening connector 6 with which the usual flexible hose of a suction cleaner may be detachably connected.

The hose may be provided in the usual manner at its outer end with a suitable nozzle or other tool for cleaning any desired surface or article. The air blast induced by the cleaner is drawn through such tool and hose and through the connector 6 into the interior of the tank member 1.

Assembled as a part of the dome unit 4 is a foraminous primary filter supporting cone 7 around which a usual primary paper filter member 8 is located when the cleaner is operated in the usual manner. The paper filter member 8 is generally conically shaped and is centered at the apex of its cone by a filter locating support member 9 preferably centrally located within the tank member 1 at the bottom thereof.

The dome unit 4 may be provided with a handle 10 for manipulating the cleaner, and operation of the cleaner may be controlled by switch 11 in the wiring for the cleaner which may be connected to any suitable source of power by cord 12.

The dome unit 4 further has mounted therein a motor-fan unit generally designated at 13 which may be mounted on a rubber mounting ring 14 within a cup-shaped preferably sheet metal housing member 15 connected with the dome unit 4 in any suitable way (not shown). The cup-shaped housing member 15 is provided with a series of apertures 16 in its bottom wall which form the suction inlet openings for the motor-fan unit 13 so that the flow of air induced by the motor-fan unit 13 which passes from the suction inlet opening 6 to within the tank member 1, then flows through the primary paper filter 8, the foraminous cone member 7, through apertures 16 and then through the motor-fan unit 15, and is exhausted therefrom through openings 17 provided in the dome unit 4.

In accordance with the present invention, an annular rubber secondary filter mounting member, generally indicated at 18, circumferentially surrounds the bottom corner of the housing member 15. The member or ring 18 has a cylindrical flange portion 19 which surrounds and grips the outer cylindrical surface of the housing member 15, and also has a reduced annular neck portion 20 forming an opening 21 which surrounds and communicates with the apertures 16. An annular inwardly opening groove 22 is formed in the neck portion 20, and the groove 22 has an enlarged diameter portion indicated at 23, and a reduced tapering diameter portion indicated at 24.

A secondary filter centering member generally indicated at 25 is mounted on the housing member 15 axially thereof, preferably by integral buttons 26 extending through suitable apertures as shown in Fig. 3, the member 25 being preferably formed of rubber or other resilient compressible material so that the buttons 26 may be inserted through and retained by said openings.

The member 25 is provided with an annular groove generally indicated at 27 opening outwardly toward and generally in the plane of the groove 22. The groove 27 has an enlarged diameter portion 28 generally opposite the enlarged diameter portion 23 of groove 22, and a reduced diameter portion 29 generally opposite the tapering diameter portion 24 of groove 22 so that the portions 28 and 29 of groove 27 form a series of annular shoulders within the groove 27. A central opening 30 is provided in the member 25 through which the screw 31 may extend which is used to assemble the cone member 7 to the motor-fan unit 13 and dome unit 4.

In accordance with the present invention, the secondary filter preferably comprises disc-like members 32 and 33 which are inserted in and seated in grooves 22 and 27 of members 18 and 25, respectively. The disc member 32 is located by portions 23 and 28, and the disc member 33 is located and held by portions 24 and 29. The disc member 32 is preferably formed of wire fabric screening material or hardware cloth having sufficient stiffness or rigidity to be maintained by and held in place in grooves 22 and 27, spaced from apertures 16. The disc-like filter member 33 is preferably made of dust filtering material having sufficient porosity to permit air currents to pass therethrough and having sufficient stiffness to maintain itself in place when held in grooves 22 and 27 of members 18 and 25, respectively. The disc-like member 33 may be made of fabric scrim and dust filtering paper or may be made of dust filtering paper alone.

In assembling the secondary filter to the cleaner, the wire mesh disc member 32 may be positioned in and held by grooves 22 and 27 by distorting the flanges 34 and 35. This is possible since members 18 and 25 are formed of rubber or other flexible material. Member 25 centers the disc member 32 when being assembled, and groove portions 23 and 28 hold the member 32 in proper position. The dust filtering disc member 33 may then be assembled to members 18 and 25 in a similar manner by distorting flanges 34 and 35. The outer edge of dust filtering member 33 is held in place by flange 34 while its inner opening is engaged by flange 35 so as to be located by and seated in groove portions 24 and 29.

When the cleaner is operating, the suction of the motor-fan unit 13 tends to increase the seal of the flanges 34 and 35 against the free edges of the filter disc 33. The spacing of the grooves 22 and 27 away from apertures 16, and the stiffness of the disc member 32, prevent the dust filtering disc 33 from being drawn by the suction against the housing wall in which the apertures 16 are formed. If this should occur, the effective filter area of the filter member 33 would be cut down to the area of the apertures 16.

It is apparent that the filter disc 33 may be readily located in proper position and can be readily replaced when occasion demands simply by removing screw 31 and cone member 7 from the dome unit 4 when filter disc 33 is readily accessible. When the filter disc 33 is in place and the cleaner operating, it provides a secondary filter protecting the motor from dust damage in event the cleaner should be operated without a primary filter 8. Furthermore, the improved secondary filter construction is very inexpensive in that it only involves the addition of the two rubber members 18 and 25 and the two disc members 32 and 33. Nevertheless, it is effective to prevent cleaner motor dust damage and it provides for replacement of the filter disc 33 when desired with minimum expense.

Accordingly, the present invention provides a new and improved secondary filter construction for a tank type suction cleaner and provides a construction which eliminates prior art difficulties and overcomes problems in the tank type cleaner field.

In the foregoing description, certain terms have been used for brevity, clearness and understanding, but no unnecessary limitations are to be implied therefrom beyond the requirements of the prior art, because such terms are used for descriptive purposes herein and not for the purpose of limitation and are intended to be broadly construed.

Moreover, the description of the improvements is by way of example and the scope of the present invention is not limited to the exact details illustrated or the specific device shown.

Having now described the features, discoveries and principles of the invention, the construction and operation of a preferred embodiment thereof, and the advantageous, new and useful results obtained thereby; the new and useful elements, combinations, sub-combinations, arrangements, and constructions, and mechanical equivalents thereof obvious to those skilled in the art are set forth in the appended claims.

I claim:

1. In a tank type suction cleaner, a motor-fan unit having a housing member provided with a bottom wall, there being suction inlet apertures formed in said bottom wall, an L-shaped rubber ring having a cylindrical flange circumferentially gripping the housing member around said bottom wall and having a reduced neck portion, there being an annular groove formed in said neck portion spaced axially from said bottom wall, a rubber centering member mounted on said bottom wall provided with an annular outwardly opening groove facing said first mentioned groove, and filter disc means removably mounted in said grooves.

2. In a tank type suction cleaner, a motor-fan unit having a housing member provided with a bottom wall, there being suction inlet apertures formed in said bottom wall, a rubber ring mounted on said housing member, a rubber centering member mounted on said bottom wall, there being opposed annular grooves formed in said centering member and ring spaced from said bottom wall, and filter disc means mounted in said grooves.

3. The construction set forth in claim 2 in which the filter disc means comprises a plurality of discs, one of said discs comprising dust filtering material and another of said discs being screen-like and supporting said first disc spaced from said bottom wall.

4. The construction set forth in claim 2 in which said filter disc means comprises an inner and an outer disc, the inner disc being wire fabric and the outer disc including paper dust filtering material.

5. The construction set forth in claim 2 in which the grooves are formed with annular shoulders, and in which the filter disc means comprises a wire screen disc member seated in one set of facing groove shoulders in said centering member and ring, and a second dust filtering disc seated in another set of facing groove shoulders in said centering member and ring.

6. In a tank type suction cleaner, a motor-fan unit having a cup-shaped housing member, there being apertures in the bottom wall of said housing member forming fan suction inlet means, a primary dust filter, a flexible ring having a cylindrical flange portion circumferentially gripping the cup-shaped housing member adjacent to the bottom wall thereof and having a reduced neck portion, there being an annular groove formed in said neck portion spaced axially from said bottom wall, a rubber centering member detachably connected to said bottom wall and having an annular outwardly opening groove facing the first mentioned groove, and filter discs removably mounted in the groove in said reduced neck portion and having central openings therein, the portions of said filter discs surrounding said central openings being removably mounted in the groove in said centering member.

7. In a tank type suction cleaner, a motor-fan unit having a cup-shaped housing member, there being apertures in the bottom wall of said housing member forming fan suction inlet means, a primary dust filter, a flexible ring having a cylindrical flange portion circumferentially gripping the cup-shaped housing member adjacent to the bottom wall thereof and having a reduced neck portion, there being an annular groove formed in said neck portion spaced axially from said bottom wall, a rubber centering member having integral buttons thereon detachably connecting said centering member to said bottom wall and having an annular outwardly opening groove facing the first mentioned groove, and filter discs removably mounted in the groove in said reduced neck portion and having central openings therein, the portions of said filter discs surrounding said central openings being removably mounted in the groove in said centering member.

8. In a tank type suction cleaner, a motor-fan unit having a housing wall provided with suction inlet apertures, a foraminous filter supporting cone surrounding said motor-fan unit, a conical paper dust filter supported on said supporting cone, a flexible ring carried by said wall, and a secondary dust filter disc mounted in said ring spaced from said wall between the wall and the conical paper dust filter.

9. In a tank type suction cleaner, a motor-fan unit having a cup-shaped housing member, there being suction inlet apertures in the bottom wall of said housing member, a foraminous filter supporting cone surrounding said motor-fan unit, a screw in the apex of said supporting cone connected to the central portion of said bottom wall, an L-shaped rubber ring having a cylindrical flange circumferentially gripping the housing member around said bottom wall and having a reduced neck portion, there being an annular groove formed in said neck portion spaced axially from said bottom wall, a rubber centering member mounted on said bottom wall and having a central opening receiving said screw, the centering member having an outwardly opening groove facing said first mentioned groove, and filter disc means removably mounted in said grooves.

EUGENE F. MARTINET.

REFERENCES CITED

The following references are of record in the file of this patent:

UNITED STATES PATENTS

| Number | Name | Date |
|---|---|---|
| 1,855,672 | Gudka | Apr. 26, 1932 |
| 2,062,834 | Schwartz | Dec. 1, 1936 |
| 2,091,044 | Hewitt | Aug. 24, 1937 |
| 2,174,443 | Lofgren | Sept. 26, 1939 |
| 2,226,630 | McCord | Dec. 31, 1940 |